United States Patent
Asami et al.

(10) Patent No.: US 11,472,974 B2
(45) Date of Patent: Oct. 18, 2022

(54) ACTIVE-ENERGY-RAY-CURABLE COMPOSITION, ACTIVE-ENERGY-RAY-CURABLE INK, COMPOSITION STORED CONTAINER, APPARATUS AND METHOD FOR FORMING TWO-DIMENSIONAL OR THREE-DIMENSIONAL IMAGE, TWO-DIMENSIONAL OR THREE-DIMENSIONAL IMAGE, STRUCTURE, AND PROCESSED PRODUCT

(71) Applicant: RICOH COMPANY, LTD., Tokyo (JP)

(72) Inventors: Tsuyoshi Asami, Kanagawa (JP); Tomohiro Hirade, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 4 days.

(21) Appl. No.: 16/728,866

(22) Filed: Dec. 27, 2019

(65) Prior Publication Data

US 2020/0131382 A1   Apr. 30, 2020

Related U.S. Application Data

(63) Continuation of application No. 15/069,411, filed on Mar. 14, 2016, now abandoned.

(30) Foreign Application Priority Data

Mar. 13, 2015 (JP) .................................. 2015-050603
Jan. 21, 2016 (JP) .................................. 2016-010070

(51) Int. Cl.
*C09D 11/101* (2014.01)
*C09D 11/324* (2014.01)

(52) U.S. Cl.
CPC .......... *C09D 11/101* (2013.01); *C09D 11/324* (2013.01)

(58) Field of Classification Search
CPC ........................... C09D 11/101; C09D 11/324
See application file for complete search history.

(56) References Cited

U.S. PATENT DOCUMENTS

| | | |
|---|---|---|
| 2008/0063981 A1 | 3/2008 | Ohnishi |
| 2011/0092610 A1 | 4/2011 | Habashi et al. |
| 2012/0029108 A1 | 2/2012 | Nakane et al. |
| 2012/0249701 A1 | 10/2012 | Sasada et al. |
| 2013/0116358 A1 | 5/2013 | Rrahimi |
| 2014/0370214 A1 | 12/2014 | Araki |
| 2015/0368491 A1 | 12/2015 | Araki |

FOREIGN PATENT DOCUMENTS

| | | |
|---|---|---|
| JP | 03-258867 | 11/1991 |
| JP | 06-021256 | 1/1994 |
| JP | 2008-7687 A | 1/2008 |
| JP | 2008-291266 | 12/2008 |
| JP | 2009-057546 | 3/2009 |
| JP | 2010-013506 | 1/2010 |
| JP | 2012-031254 | 2/2012 |
| JP | 2012-207117 | 10/2012 |
| JP | 2012-236885 | 12/2012 |
| JP | 2014-173039 A | 9/2014 |

OTHER PUBLICATIONS

Information Offer Form issued Jun. 5, 2019 in Japanese Patent Application No. 2016-10070 (with English translation) citing document AO therein, 9 pages.
Office Action dated Nov. 12, 2019, in Japanese patent application No. 2016-10070 (w/ English translation) 6 pages.
Japanese Information Offer Form issued on Jun. 27, 2019, in Patent Application No. 2016-10070, citing document AP therein, 3 pages (with English translation).

*Primary Examiner* — Jessica M Roswell
(74) *Attorney, Agent, or Firm* — Grüneberg and Myers, PLLC

(57) ABSTRACT

An active-energy-ray-curable composition, which satisfies the following relationships of absorbance: a ratio of absorbance at a wavelength of 400 nm to absorbance at a wavelength of 750 nm is 1.4 or more but 1.6 or less; and a ratio of absorbance at a wavelength of 365 nm to absorbance at a wavelength of 500 nm is 1.2 or less.

11 Claims, 6 Drawing Sheets

ACTIVE-ENERGY-RAY-CURABLE COMPOSITION, ACTIVE-ENERGY-RAY-CURABLE INK, COMPOSITION STORED CONTAINER, APPARATUS AND METHOD FOR FORMING TWO-DIMENSIONAL OR THREE-DIMENSIONAL IMAGE, TWO-DIMENSIONAL OR THREE-DIMENSIONAL IMAGE, STRUCTURE, AND PROCESSED PRODUCT

CROSS-REFERENCE TO RELATED APPLICATIONS

This is a continuation of U.S. application Ser. No. 15/069,411, filed Mar. 14, 2016, which claims priority under 35 U.S.C. § 119 to Japanese Patent Application No. 2015-050603, filed on Mar. 13, 2015 and Japanese Patent Application No. 2016-010070, filed on Jan. 21, 2016, of which all of the disclosures are incorporated herein by reference in their entireties.

BACKGROUND OF THE DISCLOSURE

Field of the Invention

The present disclosure relates to active-energy-ray-curable compositions, active-energy-ray-curable inks, composition stored containers, apparatuses and methods for forming two-dimensional or three-dimensional images, two-dimensional or three-dimensional images, structures, and processed products.

Description of the Related Art

Active-energy-ray-curable inks containing an active-energy-ray-curable composition have little odor, are quickly dried, and can be recorded on a recording medium that does not absorb the ink.

Active-energy-ray-curable inks are cured using a light source such as a mercury lamp and a metal halide lamp. Recently, however, a need for using an UV-LED having a wavelength of 365 nm or 385 nm is increasing due to a demand for saving of electricity.

In general, the active-energy-ray-curable ink is cured by binding the monomers in the ink using several kinds of photopolymerizable initiator each having different absorption wavelength, depending on the kinds of light source for curing. However, a pigment in the ink absorbs the ultraviolet rays, and thus the black pigment excellent in curing ability is particularly difficult to obtain.

For example, Japanese Unexamined Patent Application Publication No. 2009-57546 discloses that use of the pigment having low absorbance at the ultraviolet region improves the yellow ink or the magenta ink in curing ability.

Japanese Unexamined Patent Application Publication No. 2012-207117 discloses that use of the resin-coated carbon black having low absorbance at the ultraviolet region improve the carbon black-containing aqueous black ink in close adhesiveness and rubfastness.

Japanese Unexamined Patent Application Publication No. 2012-031254 discloses that the ink obtained by optimizing absorbance of an initiator, a sensitizer, and a fluorescent brightening agent results in improvement in curing ability of the ink.

Japanese Unexamined Patent Application Publication No. 03-258867 discloses that use of a magenta dye improves the ink in curing ability, where the magenta dye has a ratio of absorbance at a wavelength of 500 nm to absorbance at a wavelength of 360 nm is 0.8 or more.

SUMMARY OF THE INVENTION

An object of the present disclosure is to provide an active-energy-ray-curable composition high in printing density, and excellent in curing ability by active energy rays and close adhesiveness to a base.

As means for solving the problems, an active-energy-ray-curable composition of the present disclosure satisfies the following relationships of absorbance: a ratio of absorbance at a wavelength of 400 nm to absorbance at a wavelength of 750 nm is 1.4 or more but 1.6 or less; and a ratio of absorbance at a wavelength of 365 nm to absorbance at a wavelength of 500 nm is 1.2 or less.

According to the present disclosure, an active-energy-ray-curable composition high in printing density, and excellent in curing ability by active energy rays and close adhesiveness to a base can be provided.

Figure 1:
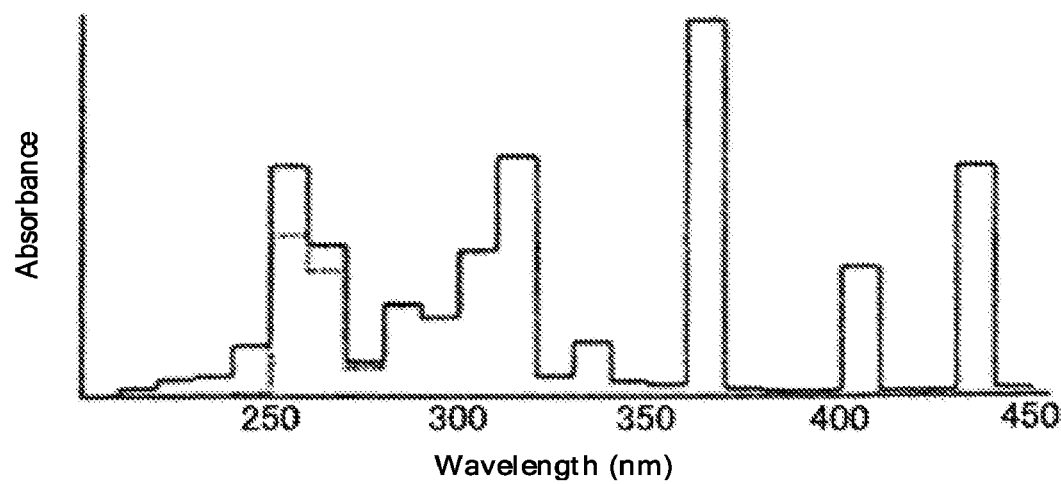
FIG. 1 is a view of one example of an ultraviolet spectrum of a mercury lamp.

DETAILED DESCRIPTION OF THE INVENTION (Active-Energy-Ray-Curable Composition)

An active-energy-ray-curable composition of the present disclosure satisfies the following relationships of absorbance: a ratio of absorbance at a wavelength of 400 nm to absorbance at a wavelength of 750 nm is 1.4 or more but 1.6 or less; and a ratio of absorbance at a wavelength of 365 nm to absorbance at a wavelength of 500 nm is 1.2 or less.

The active-energy-ray-curable composition contains a colorant, a polymerizable-unsaturated-monomer-compound, and a polymerization initiator; and further contains other components, if necessary.

The present disclosure is based on the findings that the black inks disclosed in Japanese Unexamined Patent Application Publication Nos. 2009-57546 and 03-258867 are not improved in curing ability; that the active-energy-ray-curable compositions disclosed in Japanese Unexamined Patent Application Publication No. 2012-207117 is used for aqueous inks, and not used for non-aqueous inks as a target; and that the resultant inks disclosed in Japanese Unexamined Patent Application Publication No. 2012-031254 is deteriorated in printing density.

The active-energy-ray-curable composition of the present disclosure can be used as an active-energy-ray-curable ink (may be referred to as "ink"). An application field of the active-energy-ray-curable ink is not particularly limited and may be appropriately selected depending on the intended purpose, but the active-energy-ray-curable ink is preferably used for inkjet.

In general, "active energy rays" include electromagnetic waves (e.g., radio waves, infrared rays, visible light, ultraviolet rays, X-rays, and gamma-rays) and electron beams. Here, the active energy rays of the present disclosure mean the electromagnetic waves other than the radio waves and the gamma-rays. The electron beams include electron beams generated through thermionic emission and electron beams generated through photoelectric emission. The electron beams of the present disclosure are electron beams having a shorter wavelength than the visible light region. The active energy rays are not particularly limited and may be appropriately selected depending on the intended purpose, but it is preferably light of a light-emitting diode.

A wavelength of the visible light is in a range of from about 400 nm through 750 nm. The active-energy-ray-curable composition and the ink preferably have higher absorbance in the aforementioned range because an image having higher density can be obtained.

In the present disclosure, a ratio of absorbance at a wavelength of 400 nm to absorbance at a wavelength of 750 nm is 1.4 or more but 1.6 or less, which illustrates an approximation gradient of absorbance at the visible light region. When the ratio thereof is higher than the aforementioned range, the ink tends to considerably absorb ultraviolet rays to lower curing ability. When the ratio thereof is lower than the aforementioned range, the thus-obtained image does not have high density.

Moreover, the active-energy-ray-curable composition and the ink having the approximation gradient of the absorbance falling within the aforementioned range have high absorption in the visible light region, and have a potential for outputting an image having high density.

Moreover, in the present disclosure, a ratio of absorbance at a wavelength of 365 nm to absorbance at a wavelength of 500 nm is 1.2 or less. In general, black pigment-containing active-energy-ray-curable compositions and inks, which have high absorbance at the visible light region, absorb an ultraviolet light having a wave length of 400 nm or less to lower curing ability.

The active-energy-ray-curable composition of the present disclosure has sensitivity to light of a light-emitting diode having a luminescence peak in a wavelength range of 360 nm or more but 400 nm or less. Particularly, a wavelength of 365 nm is a peak wavelength of the UV-LED lamp. Therefore, in cases where the active-energy-ray-curable composition and the ink are cured using a UV-LED, it is important to have low absorbance at a wavelength of 365 nm. Therefore, when a ratio of absorbance at a wavelength of 365 nm to absorbance at a wavelength of 500 nm, which is a representative wavelength in a lower side of the visible light region, is less than 1.2, the resultant ink is excellent in curing ability of absorbance.

In particular, when the active-energy-ray-curable composition is diluted so as to have a pigment concentration of 0.0025% by mass for measurements of absorbance, it is preferable that absorbance at a wavelength of 500 nm and absorbance at a wavelength of 700 nm be 1.3 or more and 1.0 or more, respectively. These two wavelengths are representative absorption wavelengths at the visible light region for the black ink. Therefore, whether the ink has a potential for outputting an image having high density can be determined based on whether the black ink has high absorbance at 500 nm and 700 nm.

For example, a TG/DTA (differential heat/thermogravimetry simultaneous measurement apparatus) can be used to quantify a pigment concentration in the conventional ink so that a concentration of the pigment is 0.0025% by mass through dilution.

Measurements using a TG/DTA are described in "JIS K 0129". However, a pigment concentration of the active-energy-ray-curable composition and the ink can be confirmed using the TG/DTA as follows.

A standard material ($Al_2O_3$) and the active-energy-ray-curable composition are set in a sample holder, followed by heating from 25° C. to 500° C. in a nitrogen atmosphere at a heating rate of 10° C./min. Then, the atmosphere is purged with oxygen, followed by heating to 700° C.

It can be confirmed that a weight of the sample is reduced due to the thermal decomposition of water in active-energy-ray-curable composition, and then is reduced due to thermal decomposition of the resin at about 300° C. as measured by TG.

It can be confirmed that a weight of the sample is reduced due to the thermal decomposition of the components such as water, a surfactant, a dispersant, a polymerization initiator (which may be referred to as "initiator"), and a polymerization inhibitor (which may be referred to as "inhibitor") except for the pigment in the active-energy-ray-curable composition until the heating temperature rises to 500° C. as measured by TG.

It is confirmed that, during heating from 500° C. through 600° C., the pigment is decomposed, a large peak appears by DTA, and a weight of the sample is reduced as measured by TG.

The amount of the reduced weight measured at from 500° C. through 600° C. by TG can be used to quantify of the pigment in the active-energy-ray-curable composition.

Based on the concentration of the pigment in the active-energy-ray-curable composition as measured above can be adjusted to 0.0025% by mass through dilution to measure absorbance of the ink.

In order to obtain absorbance defined in the present disclosure, it is preferable that a volume average particle diameter of dispersoid particles in the active-energy-ray-curable composition be 100 nm or more but 150 nm or less. When the volume average particle diameter thereof is less than 100 nm, a ratio of absorbance at a wavelength of 400 nm to absorbance at a wavelength of 750 nm tends to be 1.6 or more, and a ratio of absorbance at a wavelength of 365 nm to absorbance at a wavelength of 500 nm tends to be more than 1.2. Here, dispersoid particles mean solid contents in the active-energy-ray-curable composition.

Meanwhile, when the volume average particle diameter of dispersoid particles is more than 150 nm, the ratio of absorbance at a wavelength of 365 nm to absorbance at a wavelength of 500 nm tends to be 1.2 or less, but the ratio of absorbance at a wavelength of 400 nm to absorbance at a wavelength of 750 nm tends to be less than 1.4.

An amount of the dispersoid particles having a volume average particle diameter of 50 nm or less is preferably 10% by mass or less relative to the total amount of the dispersoid particles. When the amount of thereof is 10% by mass, the ratio of absorbance at a wavelength of 365 nm or less to absorbance at a wavelength of 500 nm tends to be 1.2 or less.

An amount of the dispersoid particles having a volume average particle diameter of 230 nm or more is preferably 10% by mass or less relative to the total amount of the dispersoid particles. When the amount of thereof is 10% by mass or less, the ratio of absorbance at a wavelength of 400 nm to absorbance at a wavelength of 750 nm tends to be 1.4 or more.

A pigment serving as the colorant is preferably carbon black, where the carbon black is subjected to oxidation treatment at pH 3.5 or less, and has a number average particle diameter of 40 nm or more but 60 nm or less, and a DBP oil absorption amount is 35 g/100 g or more but 55 g/100 g or less.

When the number average particle diameter of the carbon black is less than 40 nm, the ratio of absorbance at a wavelength of 400 nm to absorbance at a wavelength of 750 nm tends to be more than 1.7, and the ratio of absorbance at a wavelength of 365 nm to absorbance at a wavelength of 500 nm tends to be 1.2 or more.

Moreover, when the black carbon does not satisfy the aforementioned conditions, the active-energy-ray-curable composition and the ink excellent in dispersibility may not be obtained due to low dispersibility of the black carbon.

When the number average particle diameter of the carbon black is more than 60 nm, the ratio of absorbance at a wavelength of 365 nm to absorbance at a wavelength of 500 nm can easily be 1.2 or less, but the ratio of absorbance at a wavelength of 400 nm to absorbance at a wavelength of 750 nm tends to be less than 1.4.

A DBP oil absorption amount is used for an indicator of structure of carbon black. As the DBP oil absorption amount of the carbon black is low, structure of carbon black of the carbon black tends to be small. As the DBP oil absorption amount thereof is high, structure of carbon black tends to be large. The DBP oil absorption amount thereof is not particularly limited and may be appropriately selected depending on the intended purpose, but it is preferably 35 g/100 g or more but 55 g/100 g or less. When the DBP oil absorption amount thereof is less than 35 g/100 g, particles of the carbon have good dispersibility, but the resultant ink having high density is difficult to obtain. When the DBP oil absorption amount thereof is more than 55 g/100 g, the carbon black may generate bound solvent that does not have liquidity between particles to have high viscosity, and may be deteriorated in dispersibility.

The carbon black is preferably subjected to oxidation treatment at pH 3.5 or less. The acid-treated carbon black as described in the following structural formula contains many functional groups such as quinone, carboxyl, aldehyde, lactone, and phenol, and has high adhesiveness to the dispersant. When the carbon black is subjected to oxidation treatment at pH more than 3.5, the carbon black is deteriorated in adhesiveness to the dispersant, has large particle diameter, and has high viscosity. As a result, absorbance of the active-energy-ray-curable, which is defined in the present disclosure, cannot be obtained.

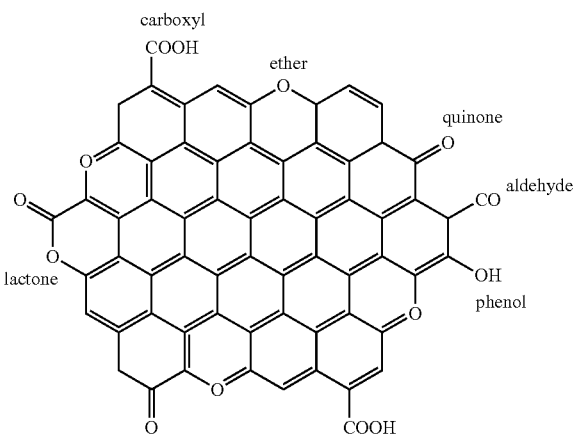

As an example of the carbon black suitable for the present disclosure, Special Black 250 (product of Orion (Degussa)) and MOGUL-L (product of CABOT) can be used.

These aforementioned carbon blacks were described as examples of usable carbon black in Japanese Unexamined Patent Application Publication No. 2012-144681, and were used in Examples of Japanese Unexamined Patent Application Publication No. 2012-031254.

However, even if the similar blacks are used for the conventional active-energy-ray-curable compositions and the inks, the ink having absorbance defined in the present disclosure cannot be obtained because a combinations with other materials, amounts of materials, and preparation methods are each different. Therefore, the ink defined in the present disclosure can be obtained by adjusting and optimizing these materials, the amounts of materials, and the preparation methods.

An amount of the colorant is preferably 2% by mass or more but 5% by mass or less relative to the total amount of the active-energy-ray-curable composition. When the amount thereof is less than 2% by mass, the prescribed concentration of the colorant cannot be obtained. When the amount thereof is more than 5% by mass, viscosity of the active-energy-ray-curable composition and viscosity of the active-energy-ray-curable ink rise to lower ejecting ability.

The active-energy-ray-curable composition may contain a cyan pigment or a derivative of a cyan pigment as a complementary color in such a range that the absorbance defined in the present disclosure can be maintained.

Examples of the cyan pigment include: a phthalocyanine pigment such as C.I. Pigment Blue series (e.g., 15:1, 15:2, 15:3, 15:4, 15:5, and 15:6); and an alkaline blue pigment such as C.I. Pigment Blue series (e.g., 18 and 56). Examples of the derivative of a cyan pigment include an acid derivative of a cyan pigment and a basic derivative of a cyan pigment, where examples of the acid derivative thereof include a carboxyl group, a sulfonic group, or a nitro group at a terminal group of the derivative, and examples of the basic derivative thereof include an amino group or an acid amide group at a terminal group of the derivative.

The dispersant is preferably a polymer dispersant. Specific examples thereof include polyoxyalkylene polyalkylenepolyamine, vinyl polymer, vinyl copolymer, acrylic polymer, acrylic copolymer, polyester, polyamide, polyimide, polyurethane, and an amino polymer.

Examples of commercially available products of the polymer dispersant include AJISPER series (product of Ajinomoto Fine-Techno Co., Inc.), SOLSPERSE series (e.g., SOLSPERSE 39000) (product of The Lubrizol Corporation (Avecia and Noveon)), DISPERBYK series and BYKJET series (both products are of BYK Japan KK), and DISPARLON series (product of Kusumoto Chemicals, Ltd.).

The acrylic block polymer having an acid value of 5 mg KOH/g or more and an amine value of 15 mg KOH/g or more is preferable because it is excellent in adhesiveness to the acid-treated carbon black. BYKJET-9151 (product of BYK Japan KK) having an acid value of 8 mg KOH/g and an amine value of 18 mg KOH/g is particularly preferable.

An amount of the dispersant added is preferably in a range of from 1/10 through 1/2, particularly preferably in a range of from 1/5 through 1/3 relative to the total amount of the pigment. The amount of the dispersant is less than 1/10, the dispersant cannot sufficiently cover the pigment particles, which causes aggregation of the pigment particles. As a result, the pigment is deteriorated in dispersibility, and thus absorbance at a wavelength of 700 nm disadvantageously becomes less than 1.0.

When the amount of the dispersant added is more than 1/2, the dispersant is excessively dissolved in a polymerizable-unsaturated-monomer-compound (may be referred to as "polymerizable-unsaturated-monomer" and "monomer"), and thus viscosity of the active-energy-ray-curable composition and viscosity of the ink rise to lower ejecting ability.

The polymerizable-unsaturated-monomer-compound used in the present disclosure is not particularly limited and may be appropriately selected depending on the intended purpose. Examples thereof include a monofunctional polymerizable-unsaturated-monomer-compound, a bifunctional polymerizable-unsaturated-monomer-compound, a trifunctional polymerizable-unsaturated-monomer-compound, and a tetrafunctional or more polymerizable-unsaturated-monomer-compound.

Examples of the monofunctional polymerizable-unsaturated-monomer-compound include 2-ethylhexyl acrylate, 2-hydroxy ethylacrylate, 2-hydroxy ethylacrylate, 2-hydroxypropyl acrylate, 2-vinyloxyethoxyethyl acrylate, 4-hydroxybutyl acrylate, 2-methyl-2-ethyl-1,3-dioxolan-4-ylmethyl acrylate, tetrahydrofurfuryl acrylate, benzyl acrylate, phenoxyethyl acrylate, isobornyl acrylate, phenyl glycol monoacrylate, cyclohexyl acrylate, and acryloyl morpholine.

Examples of bifunctional polymerizable-unsaturated-monomer-compound include 1,4-butanediol diacrylate, 1,6-hexanediol diacrylate, 1,9-nonanediol diacrylate, tripropyleneglycol diacrylate, and tetraethyleneglycol diacrylate.

Examples of the trifunctional polymerizable-unsaturated-monomer-compound include trimethylolpropane triacrylate, pentaerythritol triacrylate, and tris(2-hydroxyethyl)isocyanurate triacrylate.

Examples of the tetrafunctional or more polymerizable-unsaturated-monomer-compound include pentaerythritol tetraacrylate, dipentaerythritol pentaacrylate, ditrimethylol propane tetraacrylate, dipentaerythritol hydroxyl pentaacrylate, and dipentaerythritol hexaacrylate.

The polymerizable-unsaturated-monomer-compound may be used alone or in combination thereof. Alternatively, different two polymerizable-unsaturated-monomer-compounds may be used in combination. The polymerizable-unsaturated-monomer-compound may be a polymerizable oligomer compound.

The polymerizable oligomer compound may be appropriately synthesized, or may be a commercially available product. Examples of the commercially available product include EBECRYL 8402 (product of DAICEL-ALLNEX LTD.).

The multifunctional polymerizable-unsaturated-monomer-compound is more excellent in curing speed than the monofunctional polymerizable-unsaturated-monomer-compound. As a result, however, viscosity of the resultant ink may be high, and considerable volumetric shrinkage may occur. Therefore, it is preferable that the polymerizable-unsaturated-monomer-compound have low viscosity, and desirably have a low degree of volumetric shrinkage.

The degree of volumetric shrinkage of the polymerizable-unsaturated-monomer-compound is preferably 15% or less.

P. I. I. (skin irritation) of the polymerizable-unsaturated-monomer-compound and the polymerizable oligomer compound is not particularly limited and may be appropriately selected depending on the intended purpose, but it is preferably 1.0 or less. When the P. I. I. is 5.0 or more, skin is subjected to intense stimulation, which may be problematic for safety reasons.

Hue of the polymerizable-unsaturated-monomer-compound and the polymerizable oligomer is preferably close to colorless and transparent as far as possible, but is preferably 2 or less according to the Gardner gray scale. When the hue thereof is more than 2 according to the Gardner gray scale, color of image may change.

The active-energy-ray-curable black ink of the present disclosure necessarily contains a polymerization initiator.

The polymerization initiator is not particularly limited and may be appropriately selected depending on the intended purpose. Examples thereof include benzophenone, benzoin ethyl ether, benzoin isopropyl ether, benzyl, benzyl dimethyl ketal, α-hydroxyalkylphenone, α-aminoalkylphenone, acylphosphine oxide, oxime ester, α-dicarbonyl, thioxanthone, diethyl thioxanthone, isopropyl thioxanthone, and chlorothioxanthone. Examples of a commercially available product of the polymerization initiator include IRGACURE 819, IRGACURE 369, IRGACURE 907, DAROCURE TPO, Darocur ITX, and Lucirin TPO (all products are of BASF); and Vicure series 10 and 30 (product of Stauffer Chemical).

The polymerization initiator is desirably selected depending on wavelength characteristics of exposure lamps for curing such as a mercury lamp, a metal halide lamp, and an UV-LED lamp. In particular, it is preferable that a thioxanthone polymerization initiator be valid during forming a thin film that easily undergoes inhibition by oxygen.

Examples of a commercially available product of the thioxanthone polymerization initiator include Speedcure DETX (2,4-diethyl thioxanthone) and Speedcure ITX (2-isopropyl thioxanthone) (both products are of Lambson); and KAYACURE DETX-S (2,4-diethyl thioxanthone) (product of Nippon Kayaku Co., Ltd.).

Moreover, it is preferable that the polymerization initiator satisfy the following properties: (i) high absorption efficiency of active energy rays; (ii) being highly dissolved in the polymerizable-unsaturated-compound; (iii) low odor, low property of yellowing, and low toxicity; and (iv) non-occurrence of dark reaction.

An amount of the polymerization initiator is preferably 1.0% by mass or more but 20.0% by mass or less, more preferably 5.0% by mass or more but 15.0% by mass or less, relative to the total amount of the active-energy-ray-curable composition of the present disclosure.

It is problematic that the amount of the polymerization initiator falling within a range of less than 1.0% by mass results in reduction in curing ability of the ink, and that the amount of the polymerization inhibitor falling within a range of more than 20.0% by mass results in deterioration in film properties such as rubfastness and problematic coloring due to the color of the polymerization initiator itself.

When a mixture of the polymerizable-unsaturated-monomer-compound and the polymerization initiator is irradiated with active energy rays, the polymerization initiator generates radicals as described in formulas (I) and (II) below. The radicals allow the polymerizable double bond of the polymerizable oligomer or the polymerizable-unsaturated-monomer-compound to cause additional reaction. The radicals are further generated through the aforementioned additional reaction. The polymerization reaction proceeds as described in formula (III) below by repeating the additional reaction in the polymerizable double bond in another polymerizable oligomer or another polymerizable-unsaturated-monomer-compound.

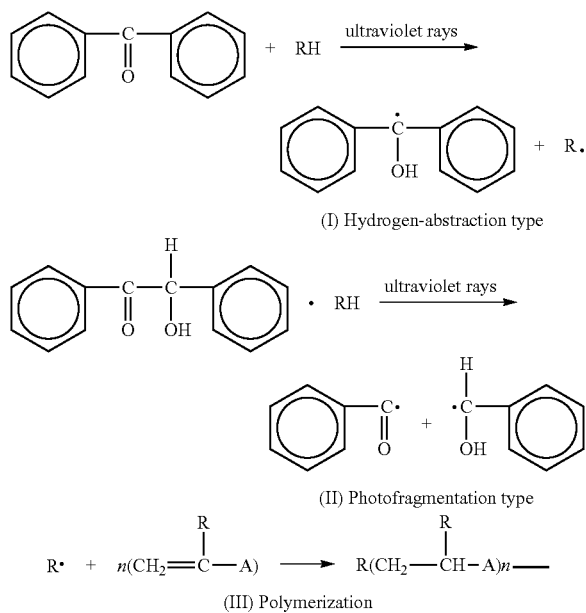

When a benzophenone polymerization initiator of hydrogen-abstraction type described in the formula (I) is used, polymerization reaction may be slow using the polymerization initiator alone. Thus, the benzophenone polymerization initiator of hydrogen-abstraction type is preferably used in combination with an amine sensitizer to enhance reactivity. The amine sensitizer prevents the polymerization initiator from providing hydrogen through the hydrogen-abstraction effect, and prevents polymerization reaction from reaction inhibition caused by oxygen in the air.

The amine sensitizer is not particularly limited and may be appropriately selected depending on the intended purpose. Examples of the amine sensitizer include triethanol amine, triisopropanolamine, 4,4-diethylamino benzophenone, 2-dimethylaminoethyl benzoic acid, 4-dimethylamino benzoic acid ethyl, and 4-dimethylamino benzoic acid isoacyl.

An amount of the sensitizer in the active-energy-ray-curable composition and the active-energy-ray-curable ink is not particularly limited and may be appropriately selected depending on the intended purpose, but it is preferably 1% by mass or more but 15% by mass or less, more preferably 3% by mass or more but 8% by mass or less.

The active-energy-ray-curable composition and the active-energy-ray-curable ink preferably contain the polymerization inhibitor in order to enhance storage stability.

The polymerization inhibitor is not particularly limited and may be appropriately selected depending on the intended purpose. Examples of the polymerization inhibitor include 2,6-di-tert-butyl-p-cresol (BHT), 2,3-dimethyl-6-tert-butylphenol (IA), anthraquinone, hydroquinone (HQ), hydroquinone monomethyl ether (MEHQ), and p-methoxyphenol.

An amount of the polymerization inhibitor in the active-energy-ray-curable composition and the active-energy-ray-curable ink is not particularly limited and may be appropriately selected depending on the intended purpose, but it is preferably 0.0025% by mass or more but 3% by mass or less.

When the amount of the polymerization inhibitor is less than 0.0025% by mass, the resultant ink is deteriorated in storage stability and raises viscosity under high temperature environment. When the amount thereof is more than 3% by mass, the resultant ink is deteriorated in ultraviolet curing ability.

When the active-energy-ray-curable composition and the active-energy-ray-curable ink contain a surfactant, the surfactant imparts interface adsorptivity to the active-energy-ray-curable composition and the ink, and a surface tension of the active energy ray curable black ink is reduced, which results in improvement of wettability and leveling ability.

The surfactant is not particularly limited and may be appropriately selected depending on the intended purpose. Examples of the surfactant include an anionic surfactant, a nonionic surfactant, a silicone surfactant, and a fluoro surfactant.

Examples of the anionic surfactant include sulfosuccinate, disulfonate, phosphate ester, sulfate, sulfonate, and a mixture thereof.

Examples of the nonionic surfactant include polyvinyl alcohol, polyacrylic acid, isopropyl alcohol, acetylene diol, ethoxylated octyl phenol, ethoxylated branched secondary alcohol, perfluorobutane sulfonic acid, and alkoxylated alcohol.

Examples of the silicone surfactant include polyether-modified polydimethylsiloxane, polyester-denatured silicone, polyether-denatured silicone, polyether-denatured polydimethylsiloxane, and polyester-denatured polydimethylsiloxane.

These silicone surfactants are preferably used for the present disclosure.

BYK-347, BYK-348, BYK-UV 3500, and BYK-UV series (3510, 3530, 3570, and 3576) (all products are of BYK Japan KK) are particularly preferable.

Examples of the fluoro surfactant include ethoxylated nonylphenol.

An amount of the surfactant in the active-energy-ray-curable composition and the active-energy-ray-curable ink is not particularly limited and may be appropriately selected depending on the intended purpose, but it is preferably 0.1% by mass or more but 3% by mass or less, more preferably 0.2% by mass or more but 1% by mass or less relative to the total amount of the active-energy-ray-curable composition. When the amount thereof is less than 0.1% by mass, wettability of the resultant ink may not be obtained. When the amount thereof is more than 3% by mass, the resultant ink is prevented from curing ability. It is advantageous in that the amount thereof falling within the preferable range results in improvement of wettability and leveling ability.

Viscosity of the active-energy-ray-curable composition and the ink during ejection from a head is preferably 3 mPa·s or more but 10 mPa·s or less. Viscosity during ejection of the ink can be adjusted by heating a head until a temperature of the ink is up to about 50° C. When the viscosity thereof is less than 3 mPa·s, the resultant ink contains dust particles. When the viscosity thereof is more than 10 mPa·s, the resultant ink is deteriorated in ejecting stability.

The viscosity can be measured using an E-type viscometer, for example.

The aforementioned materials can be used to prepare the active-energy-ray-curable composition and the ink of the present disclosure. A pigment, a dispersant, and a polymerizable-unsaturated-monomer are charged into a dispersion device such as a ball-mill, a disc-mill, a pin-mill, and a Dino-mill, and are dispersed and kneaded to prepare a pigment dispersion liquid. Then, the pigment dispersion liquid is mixed with a polymerizable-unsaturated-monomer, an initiator, an inhibitor, and a surfactant, and then the resultant mixture is formed into an ink to obtain the active-energy-ray-curable ink.

A characteristic of absorbance of the ink is different depending on materials, amounts of materials, and dispersion methods. Therefore, in order to obtain the active-energy-ray-curable composition and the ink having the characteristic of absorbance defined in the present disclosure, it is necessary to select appropriate materials, optimize amounts of the materials, a dispersion method, and a method for preparing the ink.

The active-energy-ray-curable composition and the ink of the present disclosure can be cured by the active energy rays. Examples of the light source emitting the active energy rays include a mercury lamp, a metal halide lamp, and a UV-LED lamp.

The mercury lamp is a lamp obtained by encapsulating mercury (Hg) having high purity and a small amount of noble gas in an arc tube made of quartz glass. The mercury lamp has a dominant wavelength of 365 nm, effectively emits ultraviolet rays having a wavelength of 254 nm, 303 nm, and 313 nm, and has high output power of ultraviolet rays having a short wavelength.

The metal halide lamp is a lamp obtained by encapsulating mercury and a halogenated metal in an arc tube, emits an active energy ray spectrum falling within a broad range of 200 nm or more but 450 nm or less, and has higher output power of ultraviolet rays having a long wavelength of 300 nm or more but 450 nm or less, compared to the mercury lamp.

The UV-LED lamp can reduce the environmental load due to a LED system (long lifetime and low electricity consumption), does not generate ozone, and can be compact. Therefore, the UV-LED lamp is the most suitable for curing the active-energy-ray-curable composition of the present disclosure.

Figure 2:
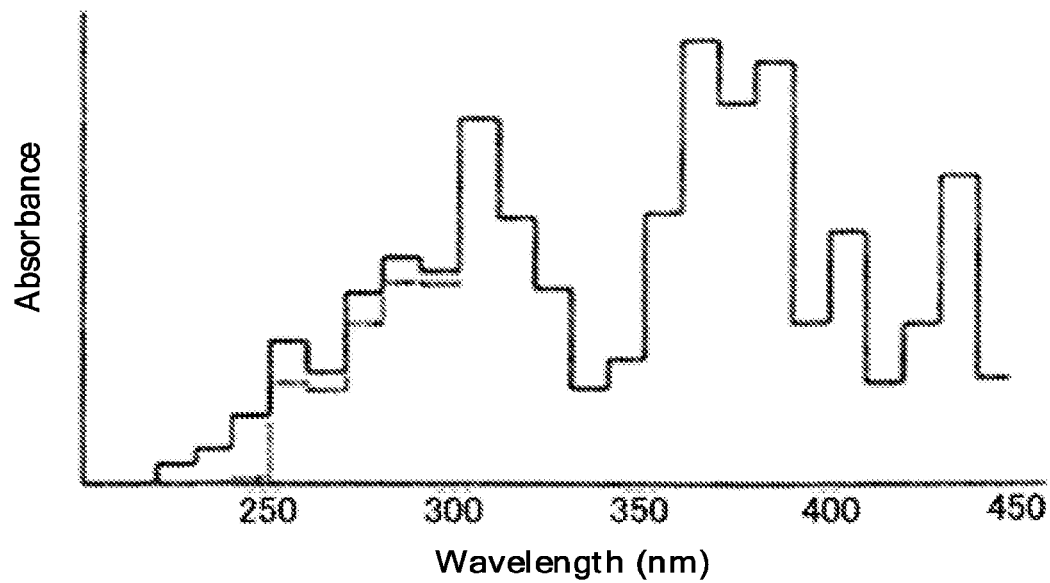
FIG. 2 is a view of one example of an ultraviolet spectrum of a metal halide lamp.
Figure 3:
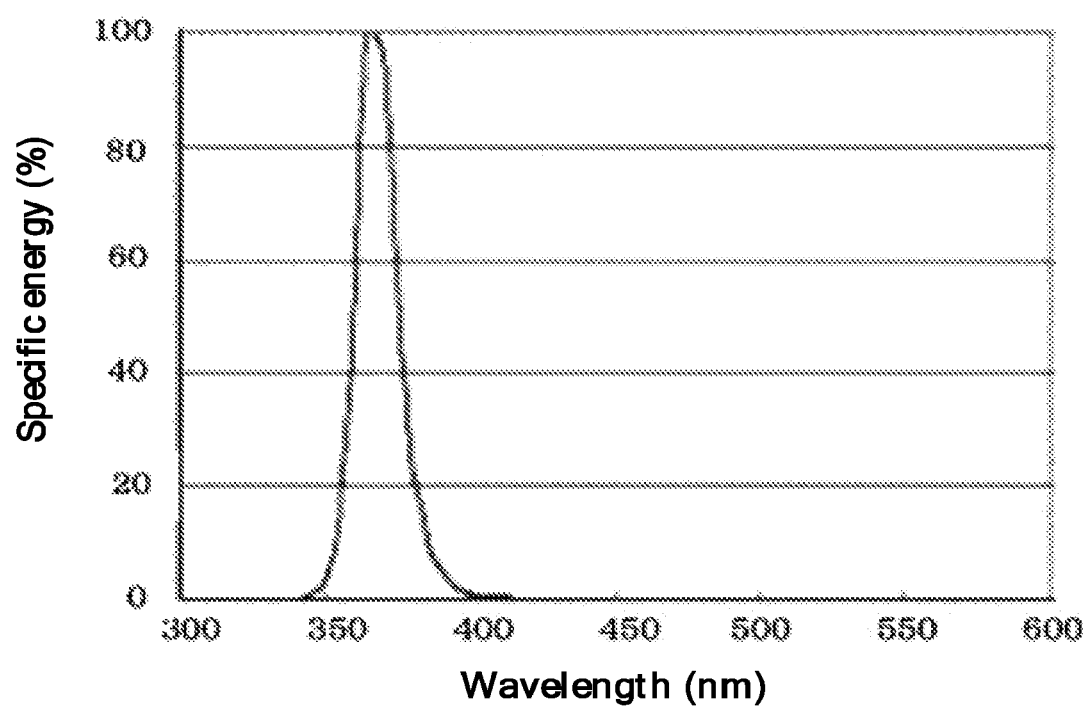
FIG. 3 is a view of one example of an ultraviolet spectrum of an UV-LED.

One example of wavelength of the light source is given in FIGS. 1, 2, and 3.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 7:
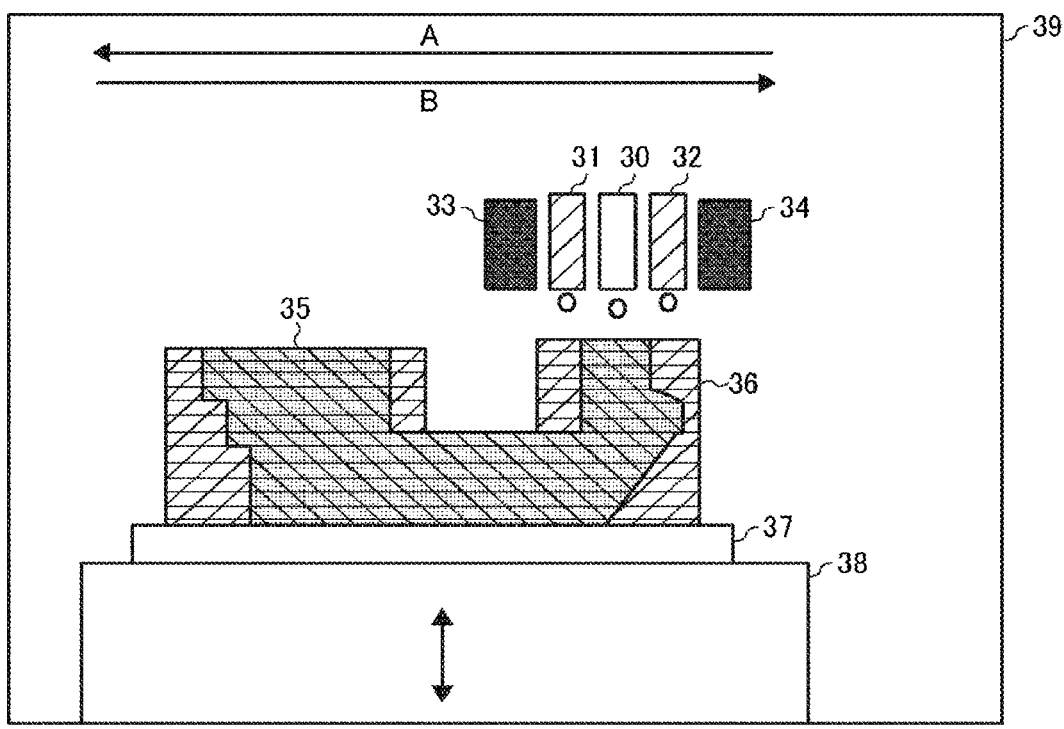
FIG. 7 is a schematic view of an example of another image forming apparatus of the present disclosure.
Figure 8A:
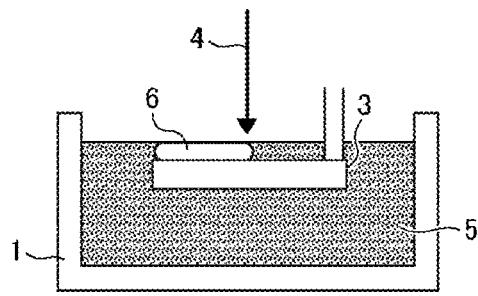
FIG. 8A is a schematic view of an example of still another image forming apparatus of the present disclosure.
Figure 8B:
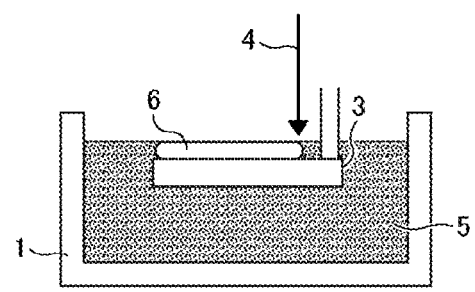
FIG. 8B is a schematic view of an example of still another image forming apparatus of the present disclosure.
Figure 8C:
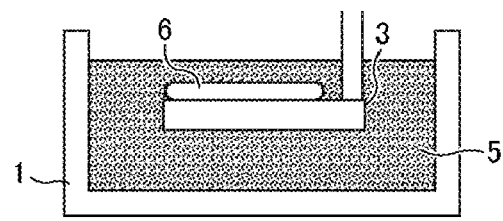
FIG. 8C is a schematic view of an example of still another image forming apparatus of the present disclosure.
Figure 8D:
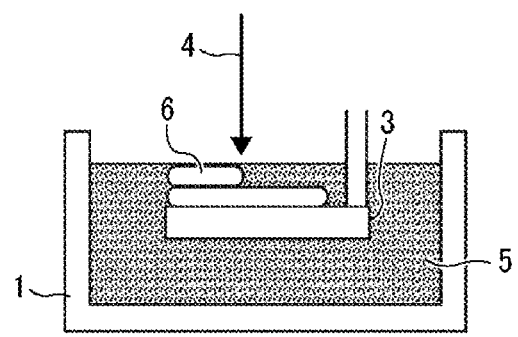
FIG. 8D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 7, FIG. 8A, FIG. 8B, FIG. 8C, and FIG. 8D. FIG. 7 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described hereinafter). FIGS. 8A to 8D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

<Composition Stored Container>

The composition stored container of the present disclosure contains a container and the active-energy-ray-curable composition or the active-energy-ray-curable composition. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

Figure 5:
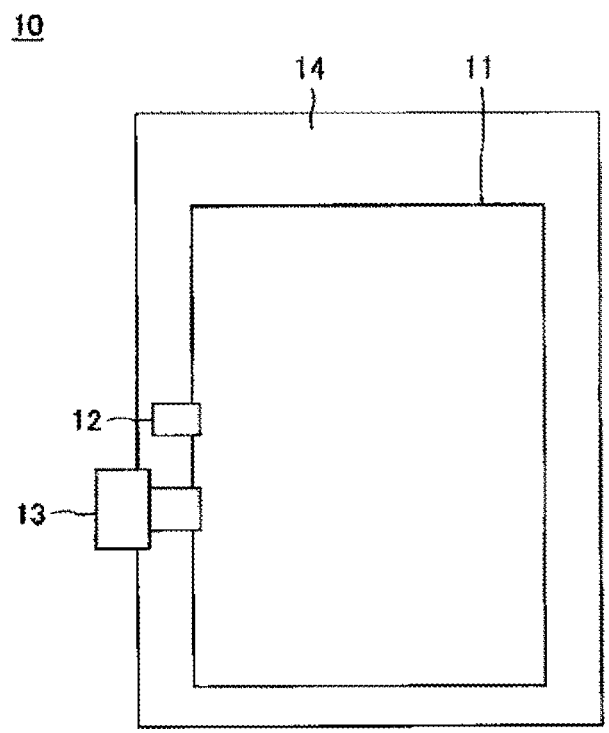
FIG. 5 is a schematic view of one example illustrating a composition stored container.

FIG. 5 illustrates one example of an ink cartridge serving as the composition stored container that contains a container, and the active-energy-ray-curable composition or the active-energy-ray-curable ink in the container. An ink bag 11 contains an ink inlet 12 and an ink outlet 13. The ink bag 11 is filled with the ink by injecting the ink from the ink inlet 12. After removing the air present inside the ink bag 11, the ink inlet 12 is sealed by fusion bonding.

When the ink bag 11 is used, a needle attached to the main body of an ink ejecting device such as an inkjet recording device is inserted into the ink outlet 13 to supply the ink to the device. The ink outlet 13 is formed of a rubber member, for example. The ink bag 11 is stored in a plastic cartridge case 14, which is used as an ink cartridge 10. The ink cartridge 10 is detachably mounted in the inkjet recording device. The ink cartridge configured to be detachably mounted makes it possible to improve the ink in work efficiency of replenishment and replacement.

<Image Forming Method and Image Forming Apparatus>

An apparatus for forming the two-dimensional or three-dimensional image of the present disclosure includes the composition stored container, and an irradiator unit configured to irradiate the active-energy-ray-curable composition or the active-energy-ray-curable ink with active energy rays;

and further preferably includes an ejecting unit configured to eject the active-energy-ray-curable ink stored in the composition stored container.

A method for forming the two-dimensional or three-dimensional image of the present disclosure includes a step of irradiating the active-energy-ray-curable composition or the ejected active-energy-ray-curable ink ejected with active energy rays, and further preferably includes a step of ejecting the active-energy-ray-curable composition or the active-energy-ray-curable ink. Moreover, in the method for forming the two-dimensional or three-dimensional image, the active energy rays with which the active-energy-ray-curable composition is irradiated is preferably light of a light-emitting diode.

The method of discharging the curable composition is not particularly limited, and examples thereof include a continuous jetting method and an on-demand method. The on-demand method includes a piezo method, a thermal method, an electrostatic method, etc.

Figure 6:
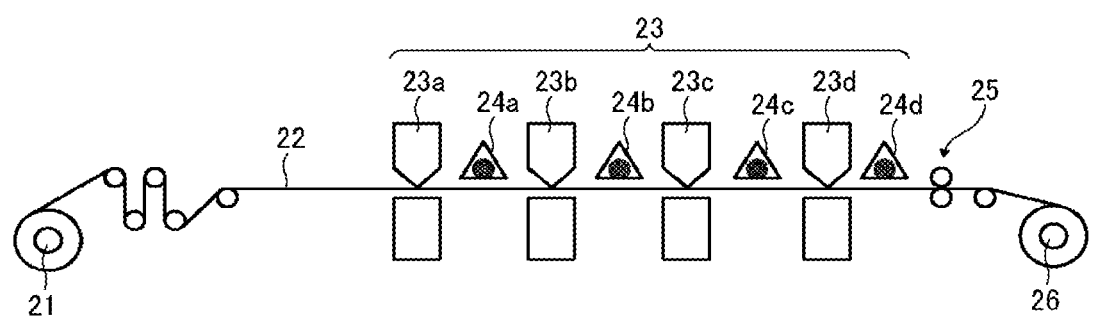
FIG. 6 is a schematic view of an example of an image forming apparatus of the present disclosure.

FIG. 6 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 7 is a schematic diagram illustrating another example of the image forming apparatus (apparatus to fabricate a 3D object) of the present disclosure. An image forming apparatus 39 illustrated in FIG. 7 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 7, it can have two or more units 30.

(Two-Dimensional or Three-Dimensional Image)

The two-dimensional or three-dimensional image can be obtained through curing by irradiating the active-energy-ray-curable composition or the active-energy-ray-curable ink with the active energy rays. Examples of the two-dimensional image include a printed matter.

Examples of the printed matter include a printed matter recorded on a smooth surface of conventional plain paper or resin film, a printed matter recorded on a concave-convex surface of the recording medium, and a printed matter on a surface of the recording medium formed of various materials such as metal and ceramic. The photopolymerizable compound or the photosetting composition of the present disclosure is suitable for a material of the ink, but is applicable to a resin for processing, a paint, an adhesive agent, an insulant, a release agent, a coating material, a sealing material, various resists, and various optical materials.

(Structure)

The structure contains a base and the two-dimensional or three-dimensional image on the base.

The base is not particularly limited and may be appropriately selected depending on the intended purpose. Examples thereof include paper, thread, fiber, fabrics, leather, metal, plastic, glass, wood, ceramic, and composite materials thereof. A plastic substrate is preferable in terms of processability.

(Processed Product)

Examples of the processed product include meters or operation panels of vehicles, office machines, electric and electronic machines, and cameras. Among them, a processed product obtained by drawing the two-dimensional or three-dimensional image, or the structure is preferable.

EXAMPLES

The present disclosure will be described with reference to the following Examples. However, it should be noted that the present disclosure is not limited to these Examples.

Example 1

The following materials were charged in the following respective amounts into a 100 ml-ball-mill loaded with zirconia beads having a diameter of 2 mm, and were dispersed at 70 revolutions/minute for 48 hours. Then, the resultant materials were charged into a sand-mill loaded with zirconia beads having a diameter of 0.1 mm for 3 hours at a circumferential velocity of 8 m/s, to obtain a pigment dispersing element.
- Carbon black (Special Black 250: product of Orion): 45 parts by mass
- Dispersant (BYKJET-9151: product of BYK Japan KK): 18 parts by mass
- Monomer (phenoxyethyl acrylate: product of Osaka Organic Chemical Industry Ltd.): 162 parts by mass The following materials were mixed in the following respective amounts with the aforementioned pigment dispersing element (15 parts by mass) to obtain an ink.
- Monomer (benzyl acrylate: product of Osaka Organic Chemical Industry Ltd.): 60 parts by mass
- Monomer (tripropylene glycol diacrylate: product of Shin Nakamura Chemical Co., Ltd.): 5 parts by mass
- Monomer (pentaerythritol triacrylate: product of Shin Nakamura Chemical Co., Ltd.): 5 parts by mass
- Surfactant (BYK-UV 3510: product of BYK Japan KK): 0.3 parts by mass
- Initiator (IRGACURE 819: product of BASF): 6 parts by mass
- Initiator (DAROCURE TPO: product of BASF): 5 parts by mass
- Initiator (Speedcure DETX: product of Lambson): 3.5 parts by mass
- Polymerization inhibitor (p-methoxyphenol: product of Nippon Kayaku Co., Ltd.): 0.2 parts by mass The obtained ink was printed and cured with an UV-LED lamp to obtain a printed sample.

Example 2

The following materials were dispersed in the following respective amounts using a homogenizer at 5,000 revolutions for 20 minutes. Then, the resultant mixture was charged into a sand-mill loaded with zirconia beads having a diameter of 0.3 mm, and was dispersed at a circumferential velocity of 8 m/s for 1 hour to obtain a pigment dispersing element.
- Carbon black (Special Black 250: product of Orion): 45 parts by mass
- Dispersant (BYKJET-9151: product of BYK Japan KK): 18 parts by mass
- Monomer (phenoxyethyl acrylate: product of Osaka Organic Chemical Industry Ltd.): 162 parts by mass The following materials were mixed in the following respective amounts with the aforementioned pigment dispersing element (15 parts by mass) to obtain an ink.
- Monomer (benzyl acrylate: product of Osaka Organic Chemical Industry Ltd.): 55 parts by mass
- Monomer (tripropylene glycol diacrylate: product of Shin Nakamura Chemical Co., Ltd.): 15 parts by mass
- Monomer (pentaerythritol triacrylate: product of Shin Nakamura Chemical Co., Ltd.): 7 parts by mass
- Surfactant (BYK-UV 3510: product of BYK Japan KK): 0.3 parts by mass
- Initiator (IRGACURE 819: product of BASF): 5 parts by mass
- Initiator (DAROCURE TPO: product of BASF): 3 parts by mass
- Initiator (Speedcure DETX: product of Lambson): 3.5 parts by mass
- Polymerization inhibitor (p-methoxyphenol: product of Nippon Kayaku Co., Ltd.): 0.2 parts by mass The obtained ink was printed and cured with an UV-LED lamp to obtain a printed sample.

Example 3

The following materials were charged in the following respective amounts into a 100 ml-ball-mill loaded with zirconia beads having a diameter of 2 mm at 70 revolutions/minute for 150 hours to obtain a pigment dispersing element.
- Carbon black (MOGUL-L: product of CABOT): 45 parts by mass
- Dispersant (SOLSPERSE 39000: product of The Lubrizol Corporation): 15 parts by mass
- Monomer (acryloyl morpholine: product of Kohjin Co., Ltd.): 165 parts by mass The following materials were mixed in the following respective amounts with the aforementioned pigment dispersing element (15 parts by mass) to obtain an ink.
- Monomer (acryloyl morpholine: product of Kohjin Co., Ltd.): 35 parts by mass
- Monomer (isobornyl acrylate: product of Osaka Organic Chemical Industry Ltd.): 20 parts by mass
- Monomer (dipentaerythritol pentaacrylate: product of Sartomer): 15 parts by mass
- Surfactant (BYK-UV 3575: product of BYK Japan KK): 0.3 parts by mass
- Initiator (IRGACURE 819: product of BASF): 5 parts by mass
- Initiator (DAROCURE TPO: product of BASF): 5 parts by mass
- Initiator (Speedcure ITX: product of Lambson): 4.5 parts by mass
- Polymerization inhibitor (2,6-di-tert-butyl-p-cresol: product of Nippon Kayaku Co., Ltd.): 0.2 parts by mass The obtained ink was printed and cured with an UV-LED lamp to obtain a printed sample.

Example 4

The following materials were charged in the following respective amounts into a 100 ml-ball-mill loaded with zirconia beads having a diameter of 2 mm at 70 revolutions/minute for 180 hours to obtain a pigment dispersing element.
- Carbon black (Special Black 250: product of Orion): 45 parts by mass
- Dispersant (BYKJET-9151: product of BYK Japan KK): 10 parts by mass
- Monomer (2-vinyloxyethoxyethyl acrylate: product of NIPPON SHOKUBAI CO., LTD.): 170 parts by mass The following materials were mixed in the following respective amounts with the aforementioned pigment dispersing element (15 parts by mass) to obtain an ink.
- Monomer (tetrahydrofurfuryl acrylate: product of Hitachi Chemical Company, Ltd.): 72 parts by mass Surfactant (BYK-UV 3510: product of BYK Japan KK): 0.5 parts by mass
Initiator (IRGACURE 819: product of BASF): 8 parts by mass
Initiator (KAYACURE DETX-S: product of Nippon Kayaku Co., Ltd.): 4.5 parts by mass The obtained ink was printed and cured with an UV-LED lamp to obtain a printed sample.

Example 5

The following materials were dispersed in the following respective amounts using a homogenizer at 8,000 revolutions for 15 minutes. Then, the resultant mixture was charged into a sand-mill loaded with zirconia beads having a diameter of 0.3 mm, and was dispersed at a circumferential velocity of 8 m/s for 1 hour to obtain a pigment dispersing element.
Carbon black (Special Black 250: product of Orion): 45 parts by mass
Dispersant (SOLSPERSE 39000: product of The Lubrizol Corporation): 14 parts by mass
Monomer (4-hydroxybutyl acrylate: product of Osaka Organic Chemical Industry Ltd.): 166 parts by mass The following materials were mixed in the following respective amounts with the aforementioned pigment dispersing element (15 parts by mass) to obtain an ink.
Monomer (4-hydroxybutyl acrylate: product of Osaka Organic Chemical Industry Ltd.): 40 parts by mass
Monomer (tripropylene glycol diacrylate: product of Shin Nakamura Chemical Co., Ltd.): 5 parts by mass
Monomer (pentaerythritol triacrylate: product of Shin Nakamura Chemical Co., Ltd.): 5 parts by mass
Surfactant (BYK-UV 3510: product of BYK Japan KK): 0.3 parts by mass
Initiator (IRGACURE 819: product of BASF): 6 parts by mass
Initiator (DAROCURE TPO: product of BASF): 5 parts by mass
Initiator (Speedcure DETX: product of Lambson): 3.5 parts by mass
Polymerization inhibitor (p-methoxyphenol: product of Nippon Kayaku Co., Ltd.): 0.2 parts by mass The obtained ink was printed and cured with an UV-LED lamp to obtain a printed sample.

Example 6

The following materials were mixed in the following respective amounts with the pigment dispersing element of Example 1 (15 parts by mass) to obtain an ink.
Monomer (acryloyl morpholine: product of Kohjin Co., Ltd.): 45 parts by mass
Monomer (tripropylene glycol diacrylate: product of Osaka Organic Chemical Industry Ltd.): 30 parts by mass
Oligomer (urethane acrylate oligomer EBECRYL 8402: product of Daicel-Cytec): 6 parts by mass
Surfactant (BYK-UV 3576: product of BYK Japan KK): 0.3 parts by mass
Initiator (IRGACURE 369: product of BASF): 3.5 parts by mass
Polymerization inhibitor (p-methoxyphenol: product of Nippon Kayaku Co., Ltd.): 0.2 parts by mass The obtained ink was printed and cured with a mercury lamp to obtain a printed sample.

Example 7

The following materials were mixed in the following respective amounts with the pigment dispersing element of Example 2 (15 parts by mass) to obtain an ink.
Monomer (2-methyl-2-ethyl-1,3-dioxolan-4-ylmethyl acrylate: product of Osaka Organic Chemical Industry Ltd.): 30 parts by mass
Monomer (isobornyl acrylate: product of Osaka Organic Chemical Industry Ltd.): 30 parts by mass
Monomer (dimethylol tricyclodecane diacrylate: product of Nippon Kayaku Co., Ltd.): 20 parts by mass
Surfactant (BYK-UV 3535: product of BYK Japan KK): 0.3 parts by mass
Initiator (IRGACURE 907: product of BASF): 4.5 parts by mass
Polymerization inhibitor (p-methoxyphenol: product of Nippon Kayaku Co., Ltd.): 0.2 parts by mass The obtained ink was printed and cured with a metal halide lamp to obtain a printed sample.

Comparative Example 1

Printing was performed in the same manner as in Example 1 except that the pigment of Example 1 was changed to MA11 (product of Mitsubishi Chemical Corporation).

Comparative Example 2

Printing was performed in the same manner as in Example 2 except that the pigment of Example 2 was changed to SBX45 (product of Asahi Carbon Co., Ltd.).

Comparative Example 3

Printing was performed in the same manner as in Example 3 except that the pigment of Example 3 was changed to MA220 (product of Mitsubishi Chemical Corporation).

Comparative Example 4

Printing was performed in the same manner as in Example 4 except that the dispersant of Example 4 was changed to DISPERBYK-168 having an amine value of 11 mg KOH/g.

Comparative Example 5

Printing was performed in the same manner as in Example 2 except that the pigment of Example 2 was changed to SB350 (product of Orion).

Comparative Example 6

Printing was performed in the same manner as in Example 2 except that the pigment of Example 2 was changed to #5 (product of Mitsubishi Chemical Corporation).

Comparative Example 7

Printing was performed in the same manner as in Example 2 except that the materials of Example 2 were not dispersed using a homogenizer but were dispersed by a dyno-mill loaded with beads having a diameter of 1.0 mm.

Comparative Example 8

Printing was performed in the same manner as in Example 2 except that the pigment of Example 2 was changed to SB550 (product of Orion).

<Evaluation>

—Absorbance—

The prepared ink was 1,200-fold diluted with precise in phenoxyethyl acrylate so that a concentration of the pigment was 0.0025% by mass to measure absorbance of the ink using a spectrophotometer U-3900H (product of Hitachi High-Technologies Corporation).

Figure 4:
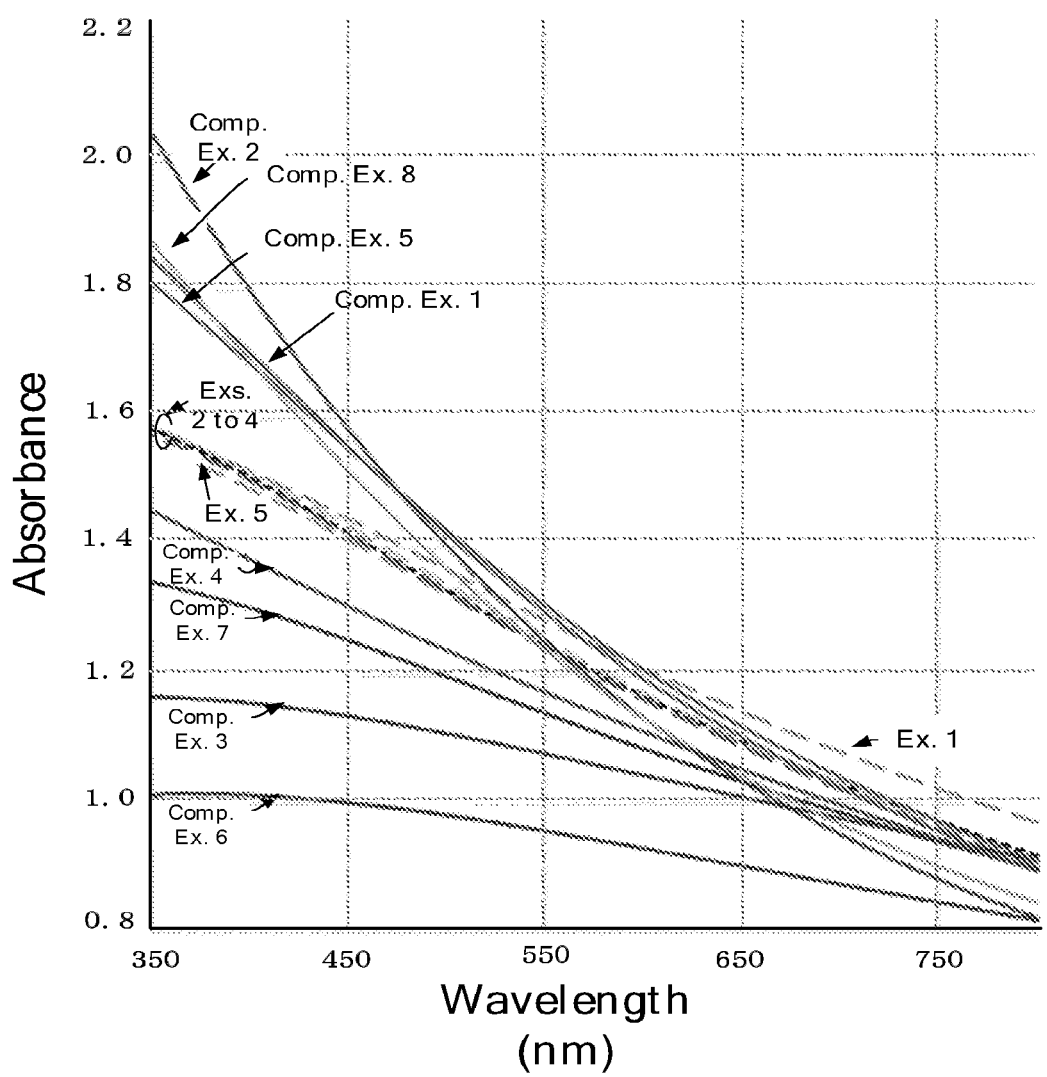
FIG. 4 is a graph of absorbance of Examples and Comparative Examples.

A graph of results of Examples and Comparative Examples was given in FIG. 4.

—Particle Diameter—

The prepared ink was about 100-fold diluted to measure a rate of the volume average particle diameter having a diameter of 50 nm or less and a rate of the volume average particle diameter having a diameter of 230 nm or more using a particle size analyzer UPA150 (product of NIKKISO CO., LTD.).

—Preparation of Printed Matter—

A solid image of the prepared ink (10 cm×10 cm) was output on a recording medium (product name: COSMOS-HINE A4300 coat PET film (100 µm), product of TOYOBO CO., LTD.) using a printer for evaluation obtained by modifying a printer (device name: SG7100, product of Ricoh Company, Ltd.) to obtain a printed sample.

—UV Curing Treatment—

A UV-LED device for inkjet printer or an UV curing device of metal halide lamp (both products are of USHIO INC.) was appropriately selected depending on the Examples. The selected device was used to cure the ink at an irradiation dose of 300 mJ/cm$^2$.

Here, an ultraviolet intensity meter (device name: UM-10) and a receiver (device name: UM-400) (both products are of Konica Minolta Sensing) were used to measure an irradiation dose.

—Printing Density—

A density of the sample subjected to curing treatment was measured using X-Rite 939, and was evaluated based on the following criteria. Results are given in Tables 1-1 and 1-2.
[Evaluation Criteria]
A: 1.80 or more
B: 1.60 or more but less than 1.80, which is not problematic for practical use.
C: 1.40 or more but less than 1.60
D: Less than 1.40

—Evaluation of Curing Ability—

A white cotton attached to a crock meter was rubbed ten times in a reciprocating manner with a load of 50 g/cm$^2$, and then a density on the white cotton was measured based on the following criteria. Results are given in Tables 1-1 and 1-2.

Curing ability was evaluated by the following formula:
Density of ink on white cotton after measurement—density of ink on white cotton before measurement.
[Evaluation Criteria]
A: Less than 0.001
B: 0.001 or more but less than 0.006
C: 0.006 or more but less than 0.010
D: 0.010 or more —Close Adhesiveness—

A part of a solid image of the printed sample after curing was cut with a cutter knife at 1 mm-intervals to have 100 squares in the solid image according to JIS K5400. Then, the solid image was peeled with a piece of an adhesive cellophane tape. Squares that were not peeled were observed and counted with a loupe to evaluate "close adhesiveness" based on the following criteria. Results are given in Tables 1-1 and 1-2.
[Evaluation Criteria]
A: 100/100
B: 80/100 or more but 99/100 or less
C: 40/100 or more but 79/100 or less
D: 0/100 or more but 39/100 or less

TABLE 1-1

| | | Example 1 | Example 2 | Example 3 | Example 4 | Example 5 | Example 6 | Example 7 |
|---|---|---|---|---|---|---|---|---|
| Carbon black | Product name | SB250 | SB250 | MOGUL L | SB250 | SB250 | SB250 | SB250 |
| | Number average particle diameter (nm) | 56 | 56 | 55 | 55 | 55 | 55 | 55 |
| | DBP oil absorption amount (g/100 g) | 46 | 46 | 45 | 45 | 45 | 45 | 45 |
| | pH | 3.1 | 3.1 | 3.0 | 3.0 | 3.0 | 3.0 | 3.0 |
| Absorbance | 500 nm | 1.364 | 1.333 | 1.326 | 1.341 | 1.330 | 1.364 | 1.333 |
| | 750 nm | 1.081 | 1.032 | 1.027 | 1.031 | 1.021 | 1.081 | 1.032 |
| | 400 nm/750 nm | 1.48 | 1.55 | 1.54 | 1.56 | 1.57 | 1.48 | 1.55 |
| | 365 nm/500 nm | 1.15 | 1.17 | 1.16 | 1.17 | 1.17 | 1.15 | 1.17 |
| Particle diameter of dispersoid particles | Volume average particle diameter (nm) | 122 | 133 | 140 | 141 | 135 | 122 | 133 |
| | Rate of particles having 50 nm or less (% by mass) | 5.5 | 6.1 | 6.7 | 7.0 | 6.5 | 5.5 | 6.1 |
| | Rate of particles having 230 nm or more (% by mass) | 2.8 | 7.5 | 9.1 | 9.2 | 7.8 | 2.8 | 7.5 |
| Evaluation results | Printing density | 1.88 A | 1.85 A | 1.83 A | 1.82 A | 1.84 A | 1.88 A | 1.85 A |
| | Curing ability | A | A | A | A | A | A | A |
| | Close adhesiveness | A | A | A | A | A | A | A |

TABLE 1-2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Carbon black | Product name | MA11 | SBX45 | MA220 | SB250 | SB250 | SB250 | SB250 | SB250 |
|  | Number average particle diameter (nm) | 29 | 22 | 55 | 55 | 31 | 76 | 55 | 25 |
|  | DBP oil absorption amount (g/100 g) | 64 | 55 | 93 | 45 | 4.5 | 71 | 45 | 47 |
|  | pH | 3.5 | 3.0 | 3.0 | 3.0 | 3.5 | 7.5 | 3.0 | 2.8 |
| Absorbance | 500 nm | 1.418 | 1.401 | 1.109 | 1.212 | 1.425 | 0.982 | 1.198 | 1.366 |
|  | 750 nm | 1.026 | 0.952 | 0.978 | 0.981 | 1.041 | 0.875 | 0.986 | 0.968 |
|  | 400 nm/750 nm | 1.78 | 2.04 | 1.23 | 1.42 | 1.73 | 1.20 | 1.39 | 1.87 |
|  | 365 nm/500 nm | 1.27 | 1.40 | 1.05 | 1.21 | 1.24 | 1.04 | 1.11 | 1.33 |
| Particle diameter of dispersoid particles | Volume average particle diameter (nm) | 135 | 106 | 229 | 155 | 127 | 251 | 131 | 199 |
|  | Rate of particles having 50 nm or less (% by mass) | 15.8 | 20.5 | 0.8 | 11.8 | 16.2 | 0.5 | 15.1 | 2.5 |
|  | Rate of particles having 230 nm or more (% by mass) | 10.4 | 1.8 | 43.2 | 11.5 | 8.4 | 73.5 | 10.5 | 23.5 |
| Evaluation results | Printing density | 1.83 | 1.90 | 1.33 | 1.58 | 1.84 | 1.24 | 1.83 | 1.45 |
|  |  | A | A | D | C | A | D | A | C |
|  | Curing ability | C | D | A | A | C | A | C | A |
|  | Close adhesiveness | C | D | A | B | D | B | C | A |

As is clear from the results in Table 1, the black inks of Examples 1 to 7 having absorbance defined in the present disclosure can be excellent in printing density, curing ability, and close adhesiveness. Meanwhile, in black inks of Comparative Examples 1 to 8, the black inks having high printing density were deteriorated in curing ability and close adhesiveness, and the black inks excellent in curing ability and close adhesiveness (Comparative Examples 3 and 8) were deteriorated in printing density.

Moreover, even if the same material is used, the ink having absorbance defined in the present disclosure may or may not be obtained. Therefore, the ink defined in the present disclosure can be obtained by optimizing the materials, the formulations, and the preparation methods.

Embodiments of the present disclosure are as follows, for example.

<1> An active-energy-ray-curable composition, which satisfies the following relationships of absorbance:

a ratio of absorbance at a wavelength of 400 nm to absorbance at a wavelength of 750 nm is 1.4 or more but 1.6 or less; and a ratio of absorbance at a wavelength of 365 nm to absorbance at a wavelength of 500 nm is 1.2 or less.

<2> The active-energy-ray-curable composition according to <1>, wherein a volume average particle diameter of dispersoid particles in the active-energy-ray-curable composition is 100 nm or more but 150 nm or less, wherein an amount of the dispersoid particles having a volume average particle diameter of 50 nm or less is 10% by mass or less relative to a total amount of the dispersoid particles, and wherein an amount of the dispersoid particles having a volume average particle diameter of 230 nm or more is 10% by mass or less relative to the total amount of the dispersoid particles.

<3> The active-energy-ray-curable composition according to <1> or <2>, wherein the active-energy-ray-curable composition includes a carbon black subjected to oxidation treatment at pH 3.5 or less, wherein a number average particle diameter of the carbon black is 40 nm or more but 60 nm or less, and wherein a DBP oil absorption amount of the carbon black is 35 g/100 g or more but 55 g/100 g or less.

<4> The active-energy-ray-curable composition according to any one of <1> to <3>, wherein the active-energy-ray-curable composition includes an acrylic block polymer having an acid value of 5 mg KOH/g or more and an amine value of 15 mg KOH/g or more.

<5> The active-energy-ray-curable composition according to any one of <1> to <4>, wherein the active-energy-ray-curable composition is a material for forming a three-dimensional object.

<6> The active-energy-ray-curable composition according to any one of <1> to <5>, wherein the active-energy-ray-curable composition has sensitivity to light of a light-emitting diode having a luminescence peak in a wavelength range of 360 nm or more but 400 nm or less.

<7> An active-energy-ray-curable ink, which satisfies the following relationships of absorbance:

a ratio of absorbance at a wavelength of 400 nm to absorbance at a wavelength of 750 nm is 1.4 or more but 1.6 or less; and a ratio of absorbance at a wavelength of 365 nm to absorbance at a wavelength of 500 nm is 1.2 or less.

<8> The active-energy-ray-curable ink according to <7>, wherein the active-energy-ray-curable ink is used for inkjet.
<9> A composition stored container including:
a container; and
the active-energy-ray-curable composition according to any one of <1> to <6> or the active-energy-ray-curable ink according to <7> or <8> in the container.
<10> An apparatus for forming a two-dimensional or three-dimensional image, the apparatus including:
the composition stored container according to <9>;
an irradiator configured to irradiate the active-energy-ray-curable composition or the active-energy-ray-curable ink with active energy rays.
<11> The apparatus for forming the two-dimensional or three-dimensional image according to <10>, the apparatus further including:
an ejecting unit configured to eject the active-energy-ray-curable composition or the active-energy-ray-curable ink.
<12> A method for forming a two-dimensional or three-dimensional image, the method including
irradiating the active-energy-ray-curable composition according to any one of <1> to <6> or the active-energy-ray-curable ink according to <7> or <8> with active energy rays.
<13> The method for forming the two-dimensional or three-dimensional image according to <12>, the method further including:
ejecting the active-energy-ray-curable composition or the active-energy-ray-curable ink.
<14> The method for forming the two-dimensional or three-dimensional image according to <12> or <13>,
wherein the active energy rays include light of a light-emitting diode.
<15> A two-dimensional or three-dimensional image, which is obtained through curing by irradiating the active-energy-ray-curable composition according to any one of <1> to <6> or the active-energy-ray-curable ink according to <7> or <8> with active energy rays.
<16> A structure including:
a base; and
the two-dimensional or three-dimensional image according to <15> on the base.
<17> A processed product, which is obtained by drawing the two-dimensional or three-dimensional image according to <15>, or the structure according to <16>.

The active-energy-ray-curable composition according to any one of <1> to <6>, the active-energy-ray-curable ink according to <7> or <8>, the composition stored container according to <9>, the apparatus for forming the dimensional or three-dimensional image according to <10> or <11>, the method for forming the dimensional or three-dimensional image according to any one of <12> to <14>, the two-dimensional or three-dimensional image according to <15>, the structure according to <16>, and the processed product according to <17> can solve the existing problems and can achieve the object of the present disclosure.

The invention claimed is:

1. An active-energy-ray-curable composition, which satisfies the following relationships of absorbance:
    a ratio of absorbance at a wavelength of 400 nm to absorbance at a wavelength of 750 nm is from 1.4 to 1.6; and
    a ratio of absorbance at a wavelength of 365 nm to absorbance at a wavelength of 500 nm is 1.2 or less,
    wherein the active-energy-ray-curable composition comprises dispersoid particles, and a volume average particle diameter of the dispersoid particles is from 100 nm to 150 nm,
    wherein an amount of the dispersoid particles having a volume average particle diameter of 50 nm or less is 7% by mass or less relative to a total amount of the dispersoid particles, and
    wherein an amount of the dispersoid particles having the volume average particle diameter of 230 nm or more is 9.2% by mass or less relative to the total amount of the dispersoid particles.

2. The active-energy-ray-curable composition of claim 1, wherein the active-energy-ray-curable composition comprises:
    from 2 mass % to 5 mass % of a carbon black, based on a total mass of the active-energy-ray-curable composition, subjected to oxidation treatment at pH 3.5 or less, wherein a number average particle diameter of the carbon black is from 40 nm to 60 nm, and a DBP oil absorption amount of the carbon black is from 35 g/100 g to 55 g/100 g;
    a polymer dispersant in an amount of from 0.2 to 0.4 of an amount of the carbon black, wherein the polymer dispersant comprises at least one acrylic block polymer having an acid value of 5 mg KOH/g or more and an amine value of 15 mg KOH/g or more; and
    a polymerizable-unsaturated-monomer-compound.

3. An active-energy-ray-curable composition, which satisfies the following relationships of absorbance:
    a ratio of absorbance at a wavelength of 400 nm to absorbance at a wavelength of 750 nm is from 1.4 to 1.6; and
    a ratio of absorbance at a wavelength of 365 nm to absorbance at a wavelength of 500 nm is 1.2 or less,
    wherein the active-energy-ray-curable composition comprises dispersoid particles, and a volume average particle diameter of the dispersoid particles is from 100 nm to 150 nm,
    wherein an amount of the dispersoid particles having a volume average particle diameter of 50 nm or less is 7% by mass or less relative to a total amount of the dispersoid particles, and
    wherein an amount of the dispersoid particles having a volume average particle diameter of 230 nm or more is 10% by mass or less relative to the total amount of the dispersoid particles.

4. A method of forming a three-dimensional object using the active-energy-ray-curable composition of claim 1, comprising curing the active-energy-ray-curable composition with active-energy rays.

5. The active-energy-ray-curable composition according to claim 1, wherein the active-energy-ray-curable composition has sensitivity to light of a light-emitting diode having a luminescence peak in a wavelength range of from 360 nm to 400 nm.

6. The active-energy-ray-curable composition according to claim 2, wherein the at least one acrylic block polymer has the acid value of from 5 to 8 mg KOH/g and the amine value of from 15 to 18 mg KOH/g.

7. The active-energy-ray-curable composition according to claim 2, wherein the at least one acrylic block polymer has the acid value of 8 mg KOH/g and the amine value of 18 mg KOH/g.

8. An active-energy-ray-curable ink, which satisfies the following relationships of absorbance:
- a ratio of absorbance at a wavelength of 400 nm to absorbance at a wavelength of 750 nm is from 1.4 to 1.6; and
- a ratio of absorbance at a wavelength of 365 nm to absorbance at a wavelength of 500 nm is 1.2 or less,
- wherein the active-energy-ray-curable ink comprises dispersoid particles, and a volume average particle diameter of the dispersoid particles is from 100 nm to 150 nm,
- wherein an amount of the dispersoid particles having a volume average particle diameter of 50 nm or less 7% by mass or less relative to a total amount of the dispersoid particles, and
- wherein an amount of the dispersoid particles having the volume average particle diameter of 230 nm or more is 9.2% by mass or less relative to the total amount of the dispersoid particles.

9. A method of using the active-energy-ray-curable ink according to claim 8, comprising ejecting the active-energy-ray-curable ink from an inkjet discharge head.

10. The active-energy-ray-curable composition of claim 1, wherein the amount of the dispersoid particles having the volume average particle diameter of 50 nm or less is between 5% and 7% by mass relative to the total amount of the dispersoid particles.

11. The active-energy-ray-curable composition of claim 1, wherein the amount of the dispersoid particles having the volume average particle diameter of 230 nm or more is between 2% and 9.2% by mass relative to the total amount of the dispersoid particles.

* * * * *